US010186862B2

(12) United States Patent
Yeung

(10) Patent No.: US 10,186,862 B2
(45) Date of Patent: *Jan. 22, 2019

(54) SYSTEM AND METHOD OF STORING AND CAPITALIZING OFF-PEAK ELECTRICITY

(71) Applicant: Yung Yeung, Bradbury, CA (US)

(72) Inventor: Yung Yeung, Bradbury, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/802,653

(22) Filed: Nov. 3, 2017

(65) Prior Publication Data

US 2018/0068398 A1    Mar. 8, 2018

Related U.S. Application Data

(63) Continuation-in-part of application No. 14/984,404, filed on Dec. 30, 2015, now Pat. No. 9,837,818.

(Continued)

(51) Int. Cl.
*H02J 7/00* (2006.01)
*H02J 9/00* (2006.01)
(Continued)

(52) U.S. Cl.
CPC ............ *H02J 3/00* (2013.01); *G06Q 30/0202* (2013.01); *G06Q 30/0283* (2013.01);
(Continued)

(58) Field of Classification Search
CPC ...... H02J 1/14; H02J 3/00; H02J 3/008; H02J 3/04; H02J 3/14; H02J 7/34; H02J 7/345
(Continued)

(56) References Cited

U.S. PATENT DOCUMENTS 9,837,818 B2 * 12/2017 Yeung ................... H02J 3/00
2014/0180886 A1    6/2014 Forbes, Jr.

FOREIGN PATENT DOCUMENTS

| CN | 102244401 A | 11/2011 |
| TW | 201322578 A | 6/2013 |
| TW | 201717521 A | 5/2017 |

OTHER PUBLICATIONS

SIPO, "1st CN Office Action and Search Report for 201580072074.9", China, dated Sep. 12, 2018.
(Continued)

*Primary Examiner* — Carlos Amaya
(74) *Attorney, Agent, or Firm* — Tim Tingkang Xia, Esq.; Locke Lord LLP

(57) ABSTRACT

An energy storage network associated with a plurality of properties, $\{B_k\}$, for storing and capitalizing off-peak electricity includes a plurality of energy storage devices coupled to an electricity grid of at least one electricity provider, each energy storage device being chargeable or dischargeable, upon demand, and associated with a respective property $B_k$; and a control unit coupled to the plurality of energy storage devices and the electricity grid, and configured to control operations of each energy storage device such that each energy storage device associated with the respective property $B_k$ is charged at an off-peak time each day when a demand for electricity is low, with an amount of off-peak electricity, $(W_{off})_k$, from the electricity grid, and is discharged at a peak time each day when the demand for electricity is high, to provide an amount of electricity, $W_k$, to the at least one electricity provider.

16 Claims, 4 Drawing Sheets

Related U.S. Application Data

(60) Provisional application No. 62/098,712, filed on Dec. 31, 2014.

(51) Int. Cl.
    *H02J 3/00*     (2006.01)
    *G06Q 50/06*     (2012.01)
    *H02J 3/14*     (2006.01)
    *G06Q 30/02*     (2012.01)
    *H02J 7/34*     (2006.01)
    *H02J 3/28*     (2006.01)
    *H02J 3/32*     (2006.01)

(52) U.S. Cl.
    CPC ............... *G06Q 50/06* (2013.01); *H02J 3/14* (2013.01); *H02J 3/28* (2013.01); *H02J 3/32* (2013.01); *H02J 7/0013* (2013.01); *H02J 7/34* (2013.01); *H02J 7/345* (2013.01); *H02J 7/0027* (2013.01); *H02J 2003/007* (2013.01); *H02J 2003/143* (2013.01); *H02J 2003/146* (2013.01); *Y02B 70/3225* (2013.01); *Y04S 20/222* (2013.01); *Y04S 20/224* (2013.01)

(58) Field of Classification Search
    USPC .......................................................... 307/66
    See application file for complete search history.

(56) References Cited

OTHER PUBLICATIONS

TPO, "1st TW Office Action and Search Report for TW Application No. 106138617", Taiwan, dated Sep. 17, 2018.

\* cited by examiner

SYSTEM AND METHOD OF STORING AND CAPITALIZING OFF-PEAK ELECTRICITY

CROSS-REFERENCE TO RELATED PATENT APPLICATIONS

This application is a continuation-in-part application of U.S. patent application Ser. No. 14/984,404, filed Dec. 30, 2015, entitled "SYSTEM AND METHOD OF STORING AND CAPITALIZING OFF-PEAK ELECTRICITY", by Yung Yeung, now allowed, which itself claims priority to and the benefit of, pursuant to 35 U.S.C. § 119(e), U.S. provisional patent application Ser. No. 62/098,712, filed Dec. 31, 2014, entitled "SYSTEM AND METHOD OF STORING AND CAPITALIZING OFF-PEAK ELECTRICITY," by Yung Yeung, which are incorporated herein in their entireties by reference.

FIELD OF THE INVENTION

The present invention relates generally to energy storage, and more particularly to energy storage network and method for storing and capitalizing off-peak electricity. The stored off-peak electricity can be sold to an electricity provider to make profits for property owners.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

There have been enormous increases in the global demand for electricity today. The electricity system is based primarily on coal-fired power stations, natural gas fired power stations and nuclear plants which operate continually and cannot be turned on and off at short notice. Since electricity cannot be stored on a large scale, it must be produced and brought to consumers at the very time it is needed. Electricity supplies are usually in shortage in-peak hours (e.g., daytime). On the other hand, the electricity supplies in off-peak time (e.g., overnight) are abundant.

To make use of the continual power, the power companies try to encourage people to use electricity overnight. Supplying in-peak electricity is costly, thus prices are set to incite consumers to shift their load outside peak hours, making off-peak power cheaper. Here are some of the main reasons for the high cost of in-peak electricity. Transmission bottlenecks: most generating plants are far from cities; if the peak demand is larger than the capacity of transmission lines bringing electricity to cities, suppliers must use closer power generators during peak hours—most often very expensive gas-fired plants. Transmission equipment cost: power lines are very expensive and must be large enough to sustain the maximum peak demand; shifting demand to off-peak hours delays installation of new transmission equipment by electricity suppliers and reduce their operating costs. Off-peak electricity may also be cheaper because some types of generators, like nuclear plants, must produce maximum power 24 hours a day during their entire lifespan; lots of electricity thus gets produced off-peak and must be sold, even at lower prices. It would gain a great deal of relevance to solving problems of energy shortage and reducing environmental pollution produced by the electricity generation if the electricity generated in the off-peak time could be massively stored and transmitted back to electricity grids at need.

Therefore, a heretofore unaddressed need exists in the art to address the aforementioned deficiencies and inadequacies.

SUMMARY OF THE INVENTION

In one aspect, the invention relates to an energy storage network associated with a plurality of properties, $\{B_k\}$, for storing and capitalizing off-peak electricity, k=1, 2, . . . N, N being the number of the plurality of properties.

In one embodiment, the energy storage network includes a plurality of energy storage devices coupled to an electricity grid of at least one electricity provider, where each energy storage device is chargeable or dischargeable, upon demand, and is associated with a respective property $B_k$; and a control unit coupled to the plurality of energy storage devices and the electricity grid, and configured to control operations of each energy storage device such that each energy storage device associated with the respective property $B_k$ is charged at an off-peak time each day when a demand for electricity is low, with an amount of off-peak electricity, $(W_{off})_k$, from the electricity grid, and is discharged at a peak time each day when the demand for electricity is high, to provide an amount of electricity, $W_k$, to the at least one electricity provider.

For the respective property $B_k$, the amount of the electricity provided to the at least one electricity provider each day is $$W_k = (1-\eta_k) \times (W_{off})_k - (W_c)_k,$$

where $\eta_k$ is a loss rate of the electricity stored in the energy storage device associated with the respective property $B_k$, and $(W_c)_k$ is an amount of consumed electricity of which the respective property $B_k$ consumes per day.

The off-peak electricity is capitalized for the respective property $B_k$ each day at an amount of $$P_k = R_k \times W_k - (R_{off})_k \times (W_{off})_k - \mu_k \times (W_{off})_k,$$

where $R_k$ is a rate of selling the stored electricity in the energy storage device associated with the respective property $B_k$ to the at least one electricity provider at the peak time, $(R_{off})_k$ is a rate of buying the electricity from the at least one electricity provider at the off-peak time for the respective property $B_k$, and $\mu_k$ is a managing cost for maintaining the energy storage device associated with the respective property $B_k$.

For the plurality of properties $\{B_k\}$, a total amount of the electricity provided to the at least one electricity provider each day is $$W_{total} = \sum_{k=1}^{N} W_k,$$

The off-peak electricity is capitalized for the plurality of properties $\{B_k\}$ each day at an amount of $$P_{total} = \sum_{k=1}^{N} P_k.$$

In one embodiment, the energy storage network further includes a plurality of electricity meters or sensors. Each electricity meter or sensor is electrically coupled to a respective energy storage device associated with the respective property $B_k$ for monitoring the amount of off-peak electricity $(W_{off})_k$, and the amount of electricity, $W_k$ for the respective energy storage device associated with the respective property $B_k$.

In one embodiment, each energy storage device includes one or more re-chargeable batteries, one or more super-capacitors, or a combination of them.

In one embodiment, the control unit comprises a plurality of controllers, each controller being operably coupled to a respective energy storage device for controlling operations of the respective energy storage device.

In one embodiment, the control unit further comprises a master controller operably coupled to the plurality of controllers for controlling operations of each of the plurality of controllers.

In one embodiment, the master controller comprises one or more computers, one or more mobile computing devices, or a combination of them.

In another aspect, the invention relates to a method of storing and capitalizing off-peak electricity.

In one embodiment, the method includes providing an energy storage network, associated with a plurality of properties, $\{B_k\}$, k=1, 2, . . . N, N being the number of the plurality of properties. The energy storage network includes a plurality of energy storage devices coupled to an electricity grid of at least one electricity provider, where each energy storage device is chargeable or dischargeable, upon demand, and is associated with a respective property $B_k$; and a control unit coupled to the plurality of energy storage devices and the electricity grid.

The method also includes controlling, by the control unit, operations of each energy storage device such that each energy storage device associated with the respective property $B_k$ is charged at an off-peak time each day when a demand for electricity is low, with an amount of off-peak electricity, $(W_{off})_k$, from the electricity grid, and is discharged at a peak time each day when the demand for electricity is high, to provide an amount of electricity $W_k$, to the at least one electricity provider.

For the respective property $B_k$, the amount of the electricity provided to the at least one electricity provider each day is $$W_k = (1-\eta_k) \times (W_{off})_k - (W_c)_k,$$

where $\eta_k$ is a loss rate of the electricity stored in the energy storage device associated with the respective property $B_k$, and $(W_c)_k$ is an amount of consumed electricity of which the respective property $B_k$ consumes per day.

The off-peak electricity is capitalized for the respective property $B_k$ each day at an amount of $$P_k = R_k \times W_k - (R_{off})_k \times (W_{off})_k - \mu_k \times (W_{off})_k,$$

where $R_k$ is a rate of selling the stored electricity in the energy storage device associated with the respective property $B_k$ to the at least one electricity provider at the peak time, $(R_{off})_k$ is a rate of buying the electricity from the at least one electricity provider at the off-peak time for the respective property $B_k$, and $\mu_k$ is a managing cost for maintaining the energy storage device associated with the respective property $B_k$.

For the plurality of properties $\{B_k\}$, a total amount of the electricity provided to the at least one electricity provider each day is $$W_{total} = \sum_{k=1}^{N} W_k,$$

The off-peak electricity is capitalized for the plurality of properties $\{B_k\}$ each day at an amount of $$P_{total} = \sum_{k=1}^{N} P_k.$$

In one embodiment, the method further comprises monitoring the amount of off-peak electricity $(W_{off})_k$, the amount of consumed electricity $(W_c)_k$, and the amount of sold electricity $W_k$ for the respective property $B_k$ per day.

In one embodiment, the monitoring step is performed by a plurality of electricity meters or sensors, each electricity meter or sensor electrically coupled to a respective energy storage device associated with the respective property $B_k$.

In one embodiment, each energy storage device comprises one or more re-chargeable batteries, one or more super-capacitors, or a combination of them.

In one embodiment, the control unit comprises a plurality of controllers, each controller being operably coupled to a respective energy storage device for controlling operations of the respective energy storage device.

In one embodiment, the control unit further comprises a master controller operably coupled to the plurality of controllers for controlling operations of each of the plurality of controllers.

In one embodiment, the master controller comprises one or more computers, one or more mobile computing devices, or a combination of them.

In yet another aspect, the invention relates to a non-transitory computer-readable medium storing instructions which, when executed by one or more processors, cause an energy storage network to perform operations of storing and capitalizing off-peak electricity, where the energy storage network has a plurality of energy storage devices coupled to an electricity grid of at least one electricity provider and associated with a plurality of properties, $\{B_k\}$, k=1, 2, . . . N, N being the number of the plurality of properties. wherein each energy storage device is chargeable or dischargeable, upon demand, and is associated with a respective property $B_k$.

The operations includes charging each energy storage device at an off-peak time each day when a demand for electricity is low, with an amount of off-peak electricity, $(W_{off})_k$, from the electricity grid; and discharging each energy storage device at a peak time each day when the demand for electricity is high, to provide an amount of electricity $W_k$, to the at least one electricity provider.

For the respective property $B_k$, the amount of the electricity provided to the at least one electricity provider each day is $$W_k = (1-\eta_k) \times (W_{off})_k - (W_c)_k,$$

where $\eta_k$ is a loss rate of the electricity stored in the energy storage device associated with the respective property $B_k$, and $(W_c)_k$ is an amount of consumed electricity of which the respective property $B_k$ consumes per day.

The off-peak electricity is capitalized for the respective property $B_k$ each day at an amount of $$P_k = R_k \times W_k - (R_{off})_k \times (W_{off})_k - \mu_k \times (W_{off})_k,$$

where $R_k$ is a rate of selling the stored electricity in the energy storage device associated with the respective property $B_k$ to the at least one electricity provider at the peak time, $(R_{off})_k$ is a rate of buying the electricity from the at least one electricity provider at the off-peak time for the respective property $B_k$, and $\mu_k$ is a managing cost for maintaining the energy storage device associated with the respective property $B_k$.

For the plurality of properties $\{B_k\}$, a total amount of the electricity provided to the at least one electricity provider each day is $$W_{total} = \sum_{k=1}^{N} W_k,$$

The off-peak electricity is capitalized for the plurality of properties $\{B_k\}$ each day at an amount of $$P_{total} = \sum_{k=1}^{N} P_k.$$

In one embodiment, the operations further comprises monitoring the amount of off-peak electricity $(W_{off})_k$, the amount of consumed electricity $(W_c)_k$, and the amount of sold electricity $W_k$ for the respective property $B_k$ per day.

In one embodiment, each energy storage device comprises one or more re-chargeable batteries, one or more super-capacitors, or a combination of them.

These and other aspects of the present invention will become apparent from the following description of the preferred embodiments taken in conjunction with the following drawings, although variations and modifications thereof may be affected without departing from the spirit and scope of the novel concepts of the invention.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
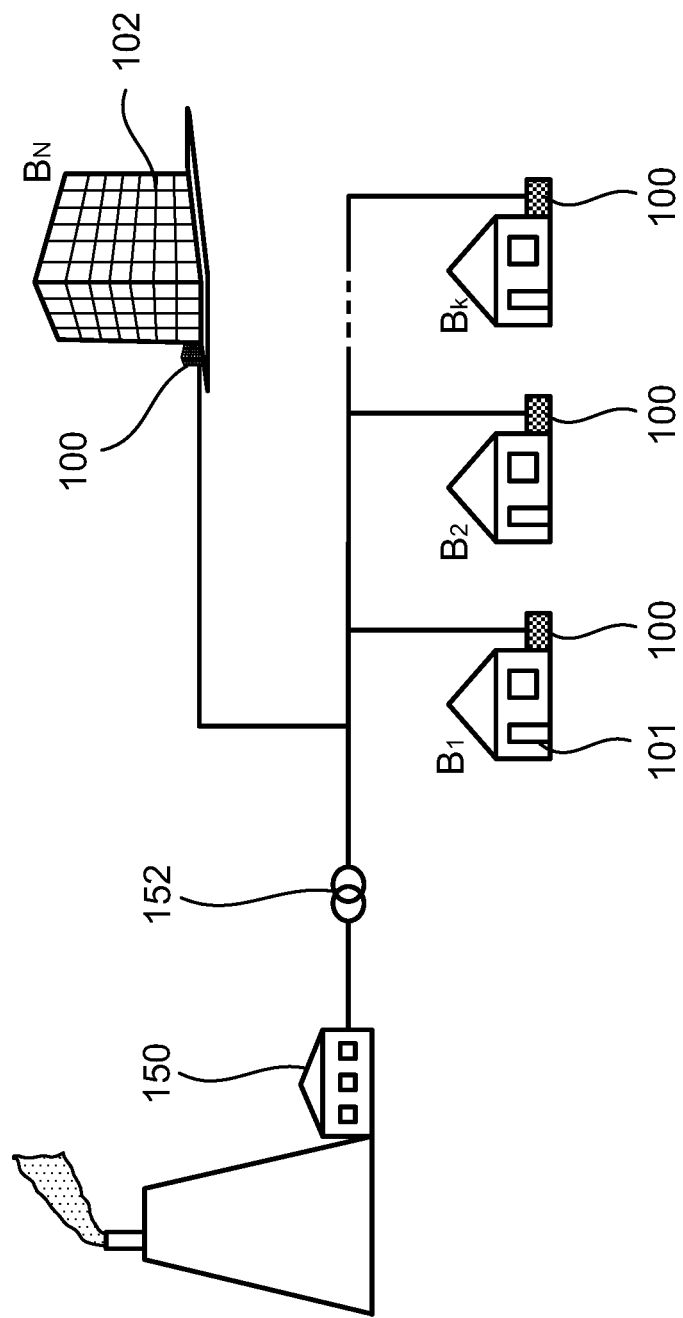
FIG. 1 shows schematically a network for storing off-peak electricity and making a profit therefrom according to one embodiment of the present invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term are the same, in the same context, whether or not it is highlighted. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, although the terms first, second, third, etc. may be used herein to describe various elements, components, regions and/or sections, these elements, components, regions and/or sections should not be limited by these terms. These terms are only used to distinguish one element, component, region, layer or section from another element, component, region, layer or section. Thus, a first element, component, region, or section discussed below could be termed a second element, component, region, or section without departing from the teachings of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

As used herein, the terms "comprise" or "comprising", "include" or "including", "carry" or "carrying", "has/have" or "having", "contain" or "containing", "involve" or "involving" and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure. As used herein, the term "and/or" includes any and all combinations of one or more of the associated listed items.

As used herein, the term "central processing unit", or its acronym "CPU", refers to one or more processors, more specifically to its processing unit and control unit within a computer or a control apparatus that carries out the instructions of a computer program by performing the basic arithmetic, logical, control and input/output (I/O) operations specified by the instructions.

The terms "chip" or "computer chip", as used herein, generally refer to a hardware electronic component, and may refer to or include a small electronic circuit unit, also known as an integrated circuit (IC), or a combination of electronic circuits or ICs.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

As used herein, the term "server" generally refers to a system that responds to requests across a computer network to provide, or help to provide, a network service. An implementation of the server may include software and suitable computer hardware. A server may run on a computing device or a network computer. In some cases, a computer may provide several services and have multiple servers running.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

As used herein, the term "re-chargeable battery" refers to a storage battery or accumulator that can be recharged for accumulating and storing electricity energy and discharged for releasing the stored electricity energy, upon demand, many times. Several different combinations of electrode materials and electrolytes, but are not limited to, are used in a re-chargeable battery, including lead-acid, nickel cadmium (NiCd), nickel metal hydride (NIMH), lithium ion (Li-ion), lithium ion polymer (Li-ion polymer), vanadium redox, zinc bromide, and nano-materials.

As used herein, the term "super-capacitor" (sometimes ultra-capacitor) refers to a high-capacity capacitor with capacitance values much higher than other capacitors that bridge the gap between electrolytic capacitors and rechargeable batteries. They typically store 10 to 100 times more energy per unit volume or mass than electrolytic capacitors, can accept and deliver charge much faster than batteries, and tolerate many more charge and discharge cycles than rechargeable batteries.

In addition, the term "property", used herein, refers to, but is not limited to, a residential property, a shop, an office building, a school building, or the likes.

The description is now made as to the embodiments of the invention in conjunction with the accompanying drawings. In accordance with the purposes of this invention, as embodied and broadly described herein, this invention, in one aspect, relates to system and method of storing off-peak electricity and making a profit therefrom for an owner of a property, and a network of storing off-peak electricity.

By the utilization of the invention, all waste electricity in industry can now be converted at any time of the day or night for the production of carbon neutral, thereby, making use of electrical power generated and normally lost via the burning of coal or natural gas from these power stations that cannot easily be varied in electricity power output for the necessary base load power at different times of the day.

In one aspect, the invention relates to a system for storing off-peak electricity. The stored off-peak electricity can be sold to an electricity provider to make a profit for an owner of a property 101 (or 102), so that the property owner can utilize the profit to pay off debt, if any. The property can be any types of properties, such as residential 101, shops, office buildings 102, school buildings, or the likes.

Figure 2:
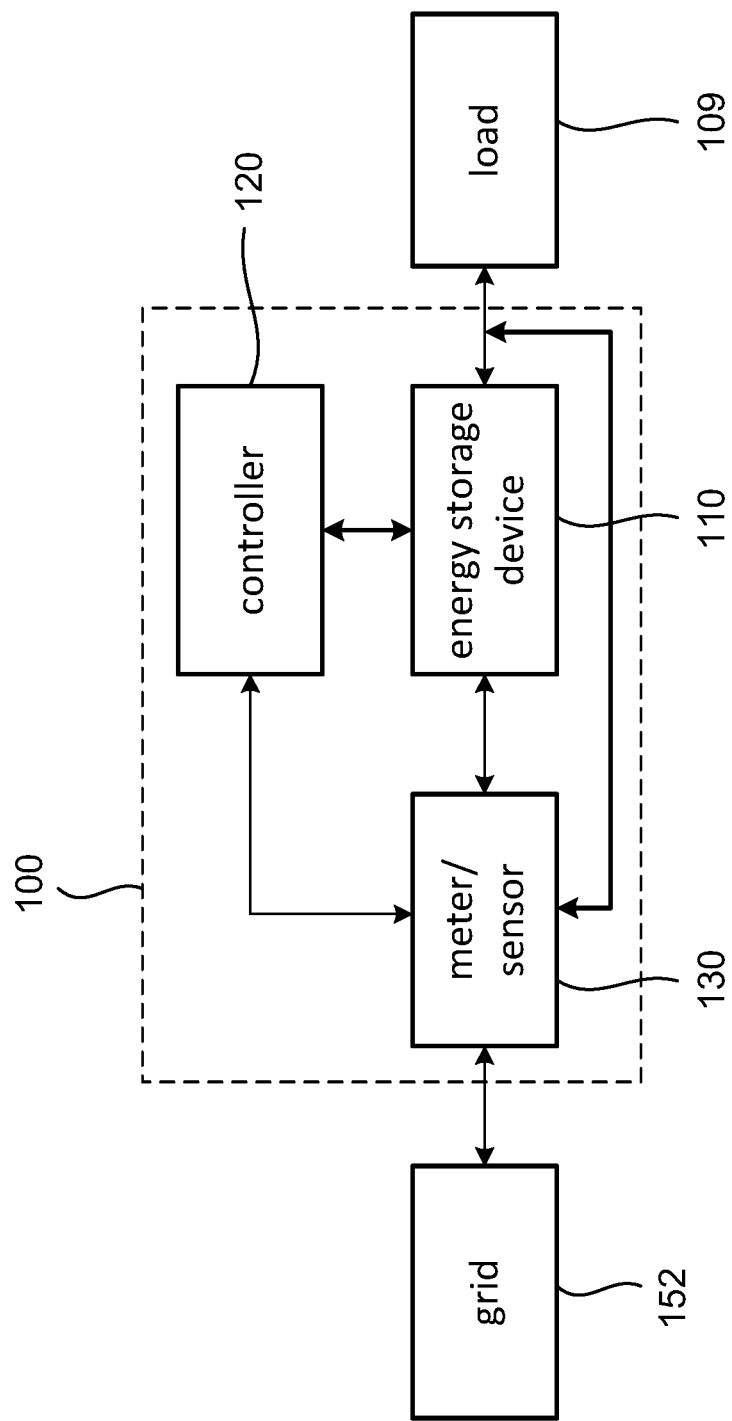
FIG. 2 shows schematically a system for storing off-peak electricity and making a profit therefrom according to one embodiment of the present invention.

As shown in FIGS. 1 and 2, the system 100 in one embodiment includes an energy storage device 110 electrically coupled to an electricity grid 152 of at least one electricity provider 150, and a controller 120 configured to control operation of the energy storage device 110. The energy storage device 110 is chargeable or dischargeable, upon demand. The controller 120 is configured to control operations of the energy storage device 110 such that the energy storage device 110 is charged at an off-peak time each day when a demand for electricity is low, with an amount of off-peak electricity, $W_{off}$, from the electricity grid 152, and is discharged at a peak time each day when the demand for electricity is high, to provide an amount of electricity, W, to the at least one electricity provider 150.

The system 100 further comprises an electricity meter or sensor 130 electrically coupled to the energy storage device 110 and the controller 120 for monitoring the amount of off-peak electricity $W_{off}$, the amount of consumed electricity $W_c$, and the amount of sold electricity W.

In one embodiment, the energy storage device 110 comprises one or more re-chargeable batteries, and/or one or more super-capacitors. The re-chargeable batteries can be any types of re-chargeable batteries. The super-capacitors can be any types of super-capacitors.

The controller 120 can be an IC chip, microprocessor, control module, computer, or control apparatus having one or more central processing units (CPUs) for controlling the operations of the energy storage device 110.

In one embodiment, the off-peak electricity is capitalized for the property owner each day at an amount of:

$$P = R \times W - R_{off} \times W_{off},$$

where R is a rate of which the property owner sells the stored electricity to the at least one electricity provider at the peak time, and $R_{off}$ is a rate of which the property owner buys the electricity from the at least one electricity provider at the off-peak time, and wherein R is at least two times greater than $R_{off}$.

In one embodiment, the amount of electricity W sold to the at least one electricity provider stratifies with:

$$W = (1-\eta) \times W_{off} - W_c,$$

where η represents an electricity loss and a maintenance cost of the energy storage device; and $W_c$ is an amount of electricity of which the property owner consumes, for example, consumed by load 109 (FIG. 2) of the property.

In another aspect, the invention relates to a method for storing off-peak electricity. The stored off-peak electricity can be sold to an electricity provider to make a profit for an owner of a property. In one embodiment, the method comprises providing an energy storage device electrically coupled to an electricity grid of at least one electricity provider and associated with a property, where the energy storage device is chargeable or dischargeable, upon demand; and controlling, by a controller, operations of the energy storage device such that the energy storage device is charged at an off-peak time each day when a demand for electricity is low, with an amount of off-peak electricity $W_{off}$ from the electricity grid, and is discharged at a peak time each day when the demand for electricity is high, to provide an amount of electricity W to at least one of a consumer and the at least one electricity provider.

Further, the method includes monitoring, by an electricity meter or sensor, the amount of the off-peak electricity $W_{off}$, the amount of consumed electricity $W_c$, and the amount of sold electricity W.

In one embodiment, the energy storage device comprises one or more re-chargeable batteries.

In one embodiment, the off-peak electricity is capitalized for the property owner each day at an amount of:

$$P = R \times W - R_{off} \times W_{off},$$

where R is a rate of which the property owner sells the stored electricity to the at least one electricity provider at the peak time, and $R_{off}$ is a rate of which the property owner buys the electricity from the at least one electricity provider at the off-peak time, and where R is greater than $R_{off}$.

In one embodiment, the amount of electricity W sold to the at least one electricity provider stratifies with:

$$W = (1-\eta) \times W_{off} - W_c,$$

where η represents an electricity loss and a maintenance cost of the energy storage device, and $W_c$ is the amount of electricity of which the property owner consumes.

In a further aspect of the invention, a system of storing off-peak electricity includes an energy storage device electrically coupled to an electricity grid of at least one electricity provider, where the energy storage device has a storing capacity of $W_{off}$, and is chargeable or dischargeable, upon demand; and a controller configured to control operation of the energy storage device such that the energy storage device is charged with the off-peak electricity at an off-peak time each day when a demand for electricity is low from the electricity grid, and is discharged at a peak time each day when the demand for electricity is high, to provide an amount of the stored electricity, to the at least one electricity provider, where the amount of the stored electricity provided to the at least one electricity provider is $$W = (1-\eta) \times W_{off} - W_c,$$

where η is a loss rate of the stored electricity, and $W_c$ is an amount of electricity of which the property owner consumes per day.

In one embodiment, the energy storage device comprises one or more re-chargeable batteries, and/or one or more super-capacitors. The re-chargeable batteries can be any types of re-chargeable batteries. The super-capacitors can be any types of super-capacitors. The controller can be an IC chip, microprocessor, control module, computer, or control apparatus having one or more CPUs for controlling the operations of the energy storage device.

In one embodiment, the profit made from providing the stored electricity to the at least one electricity provider is each day at an amount of:

$$P = (R \times W) - (R_{off} \times W_{off}) - (\mu \times W_{off}),$$

wherein R is a rate of which the property owner sells the stored electricity to the at least one electricity provider at the peak time, $R_{off}$ is a rate of which the property owner buys the electricity from the at least one electricity provider at the off-peak time, and μ is a managing cost for maintaining the energy storage device.

Figure 3:
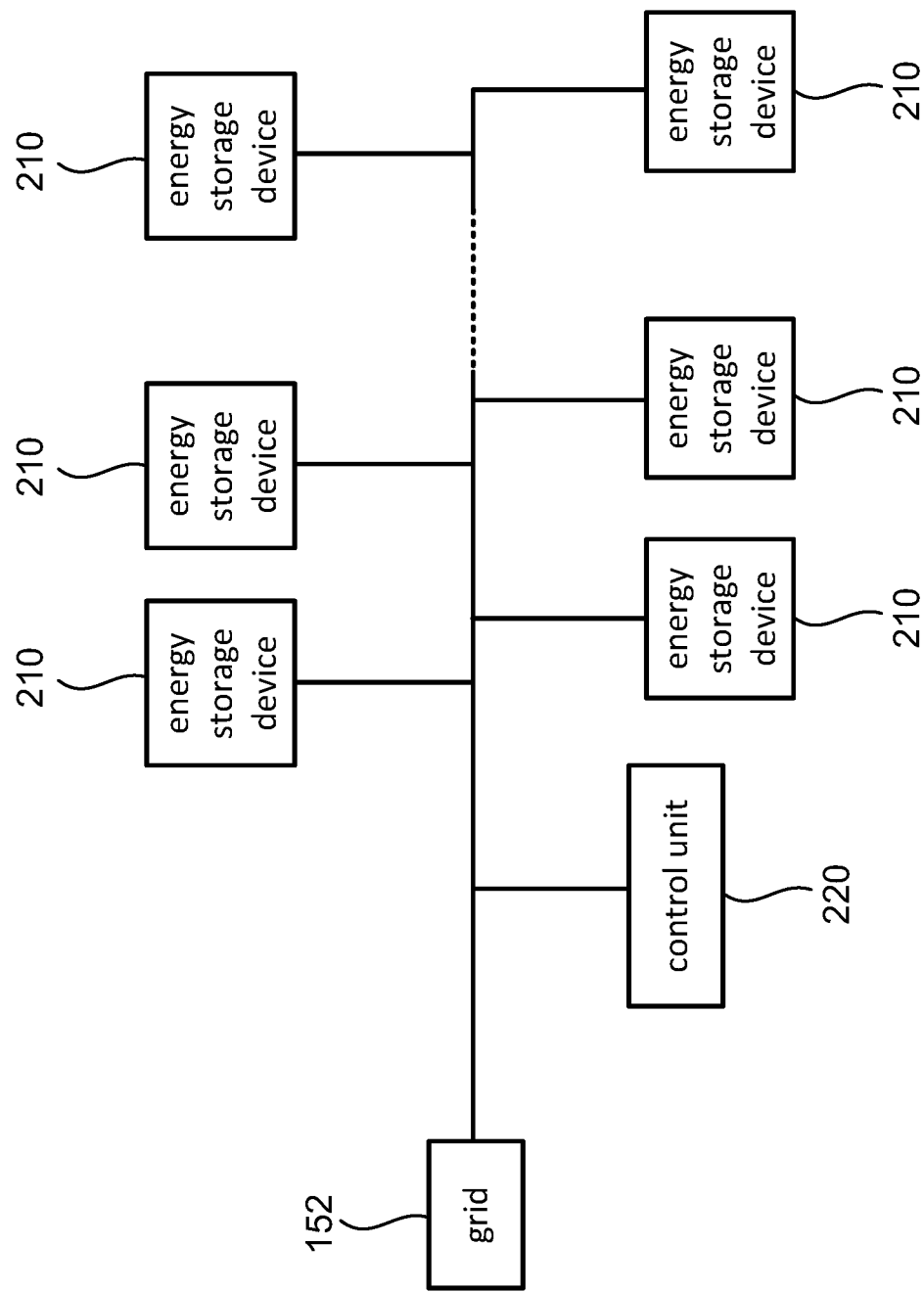
FIG. 3 shows schematically a network for storing off-peak electricity and making a profit therefrom according to one embodiment of the present invention.
Figure 4:
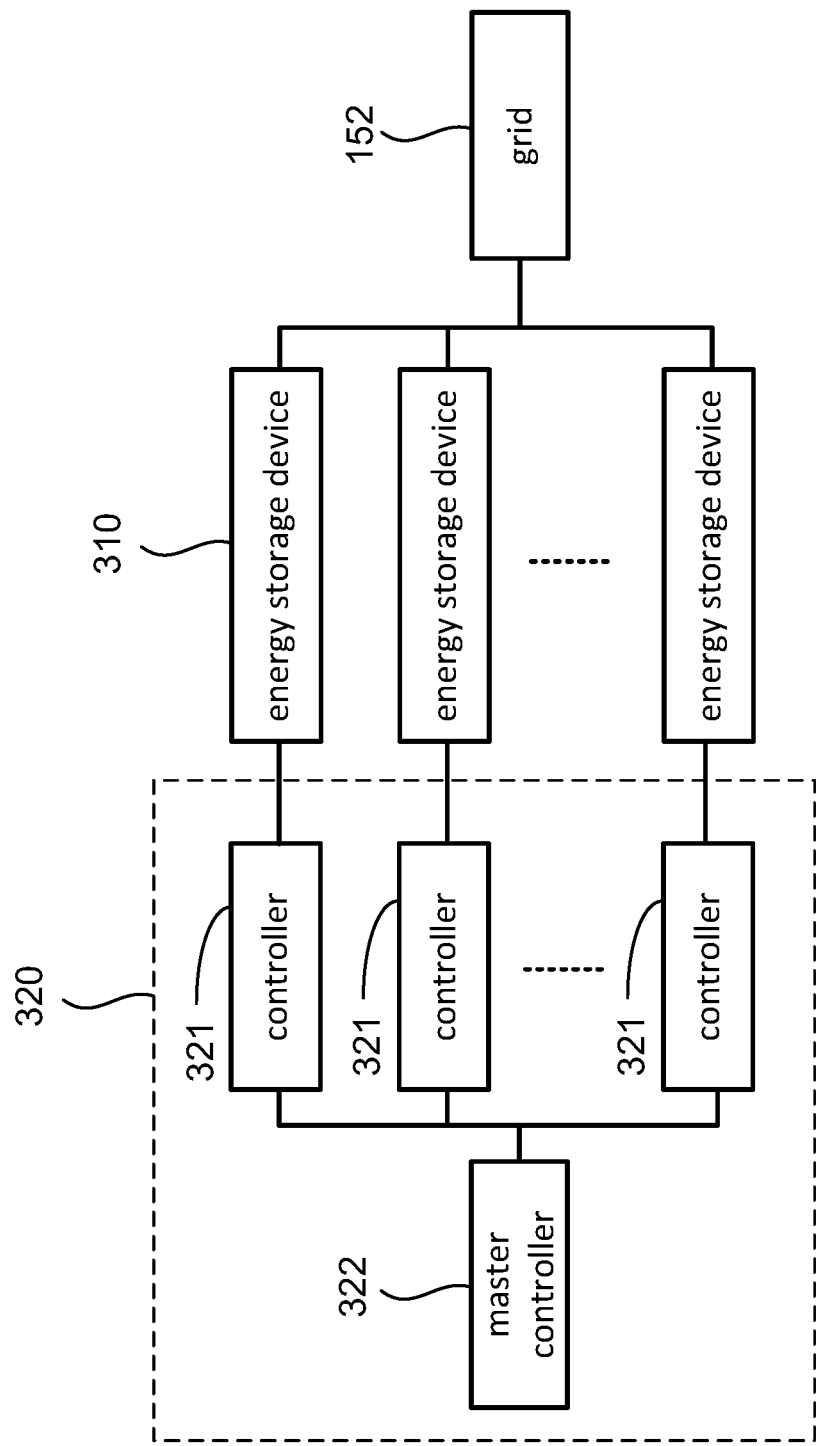
FIG. 4 shows schematically a network for storing off-peak electricity and making a profit therefrom according to another embodiment of the present invention.

Referring to FIGS. 1, 3 and 4, an energy storage network for storing and capitalizing off-peak electricity is shown schematically according to embodiments of the present invention. The energy storage network is associated with a plurality of properties, $\{B_k\}$, for storing and capitalizing off-peak electricity, k=1, 2, . . . N, N being the number of the plurality of properties, as shown in FIG. 1. The stored off-peak electricity can be sold to an electricity provider to make a profit for property owners.

In the exemplary embodiments, the energy storage network includes a plurality of energy storage devices 210 operably coupled to an electricity grid 152 of at least one electricity provider. Each energy storage device 210 is chargeable or dischargeable, upon demand, and is associated with a respective property $B_k$, as shown in FIG. 1. In some embodiments, each energy storage device 210 comprises one or more re-chargeable batteries, one or more super-capacitors, or a combination of them. In some embodiments, each energy storage device 210 may be installed in its respective property $B_k$, or in a remote location that is associated with the respective property $B_k$.

The energy storage network also includes a control unit 220 operably coupled to the plurality of energy storage devices 210 and the electricity grid 152, as shown in FIG. 2. The control unit 220 may include one or more computers, IC chips, modules, or the likes, and coupled to the plurality of energy storage devices 210 and the electricity grid 152 through the Internet, intranet, wireless, or wired connections. The control unit 220 is configured to control operations of each energy storage device 210 such that each energy storage device 210 associated with the respective property $B_k$ is charged at an off-peak time each day when a demand for electricity is low, with an amount of off-peak electricity $(W_{off})_k$ from the electricity grid 152, and is discharged at a peak time each day when the demand for electricity is high, to provide an amount of electricity $W_k$ to the at least one electricity provider.

In certain embodiments, as shown in FIG. 4, the control unit 320 comprises a plurality of controllers 321. Each controller 321 is operably coupled to a respective energy storage device 310 and configured to control operations of the respective energy storage device 310 such that each energy storage device associated with the respective property $B_k$ is charged at an off-peak time each day when a demand for electricity is low, with an amount of off-peak electricity $(W_{off})_k$ from the electricity grid, and is discharged at a peak time each day when the demand for electricity is high, to provide an amount of electricity $W_k$ to the at least one electricity provider. In certain embodiments, each controller 321 is coupled to its respective energy storage device 310 through the Internet, intranet, wireless, or wired connections.

In addition, the control unit 320 further comprises a master controller 322 operably coupled to the plurality of controllers 321 for controlling operations of each of the plurality of controllers 321. In certain embodiments, the master controller 322 may include one or more computers coupled to the plurality of controllers 321 through the Internet, intranet, wireless, or wired connections. Practically, a user may input instructions or codes to and/or configuration of each of the plurality of controllers 321 from the one or more computers through, for example, graphical user interfaces, so as to control each of the energy storage devices 310 to charge at an off-peak time each day when a demand for electricity is low, with an amount of off-peak electricity $(W_{off})_k$ from the electricity grid, and to discharge at a peak time each day when the demand for electricity is high, to provide an amount of electricity $W_k$ to the at least one electricity provider.

In one embodiment, the energy storage network further includes a plurality of electricity meters or sensors. Each electricity meter or sensor is electrically coupled to a respective energy storage device associated with the respective property $B_k$ for monitoring the amount of off-peak electricity $(W_{off})_k$, and the amount of electricity, $W_k$ for the respective energy storage device associated with the respective property $B_k$.

As such design of the energy storage network, for the respective property $B_k$, the amount of the electricity provided to the at least one electricity provider each day is $$W_k = (1-\eta_k) \times (W_{off})_k - (W_c)_k,$$

where $\eta_k$ is a loss rate of the electricity stored in the energy storage device associated with the respective property $B_k$, and $(W_c)_k$ is an amount of consumed electricity of which the respective property $B_k$ consumes per day.

The off-peak electricity is capitalized for the respective property $B_k$ each day at an amount of $$P_k = R_k \times W_k - (R_{off})_k \times (W_{off})_k - \mu_k \times (W_{off})_k,$$

where $R_k$ is a rate of selling the stored electricity in the energy storage device associated with the respective property $B_k$ to the at least one electricity provider at the peak time, $(R_{off})_k$ is a rate of buying the electricity from the at least one electricity provider at the off-peak time for the respective property $B_k$, and $\mu_k$ is a managing cost for maintaining the energy storage device associated with the respective property $B_k$.

For the plurality of properties $\{B_k\}$ associated with the energy storage network, a total amount of the electricity provided to the at least one electricity provider each day is $$W_{total} = \sum_{k=1}^{N} W_k,$$

The stored off-peak electricity is capitalized for the plurality of properties $\{B_k\}$ each day at an amount of $$P_{total} = \sum_{k=1}^{N} P_k.$$

In one aspect of the invention, a method of storing and capitalizing off-peak electricity includes providing an energy storage network, associated with a plurality of properties, $\{B_k\}$, k=1, 2, ... N, N being the number of the plurality of properties. The energy storage network includes a plurality of energy storage devices coupled to an electricity grid of at least one electricity provider, where each energy storage device is chargeable or dischargeable, upon demand, and is associated with a respective property $B_k$; and a control unit coupled to the plurality of energy storage devices and the electricity grid.

The method also includes controlling, by the control unit, operations of each energy storage device such that each energy storage device associated with the respective property $B_k$ is charged at an off-peak time each day when a demand for electricity is low, with an amount of off-peak electricity, $(W_{off})_k$, from the electricity grid, and is discharged at a peak time each day when the demand for electricity is high, to provide an amount of electricity $W_k$, to the at least one electricity provider.

In one embodiment, the method further comprises monitoring the amount of off-peak electricity $(W_{off})_k$, the amount of consumed electricity $(W_c)_k$, and the amount of sold electricity $W_k$ for the respective property $B_k$ per day.

In one embodiment, the monitoring step is performed by a plurality of electricity meters or sensors, each electricity meter or sensor electrically coupled to a respective energy storage device associated with the respective property $B_k$.

All or part of steps or operations in the embodiments of the present invention may be implemented through software, and a corresponding software program may be stored in a non-transitory tangible computer-readable medium. The non-transitory tangible computer-readable storage medium includes, but not limited to, disk, CD-ROM, read-only memory (ROM), random memory (RAM), flash drive, or the likes.

In another aspect of the invention, the non-transitory computer-readable medium storing instructions which, when executed by one or more processors, cause an energy storage network to perform operations of storing and capitalizing off-peak electricity, where the energy storage network has a plurality of energy storage devices coupled to an electricity grid of at least one electricity provider and associated with a plurality of properties, $\{B_k\}$, k=1, 2, ... N, N being the number of the plurality of properties, wherein each energy storage device is chargeable or dischargeable, upon demand, and is associated with a respective property $B_k$.

The operations includes charging each energy storage device at an off-peak time each day when a demand for electricity is low, with an amount of off-peak electricity, $(W_{off})_k$, from the electricity grid; and discharging each energy storage device at a peak time each day when the demand for electricity is high, to provide an amount of electricity $W_k$, to the at least one electricity provider.

In one embodiment, the operations further comprises monitoring the amount of off-peak electricity $(W_{off})_k$, the amount of consumed electricity $(W_c)_k$, and the amount of sold electricity $W_k$ for the respective property $B_k$ per day.

Without intent to limit the scope of the invention, examples and their related results according to the embodiments of the present invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

In the following examples, it is assumed that a property, such as an apartment or a house, having an area of 150 m$^2$, with an energy storage device installed therein for storing off-peak electricity and making a profit therefrom, provided the energy storage device has a storing capacity of 4 kWh/m$^2$/day, the energy storage device can store the off-peak electricity at an amount of $$W_{off}=(4 \text{ kWh/m}^2/\text{day} \times 150 \text{ m}^2)=600 \text{ kWh/day}$$

Further, it is assumed that
(1) the stored electricity is sold to the at least one electricity provider at the rate of $$R=¥1/\text{kWh},$$

where ¥ is represented as the Chinese yuan (CNY);
(2) the cost of the off-peak electricity is about $$R_{off}=¥0.25/\text{kWh};$$

(3) the storing loss of the off-peak electricity is about $\eta$=10% of the storing capacity;

(4) the managing cost for maintaining the energy storage device is about $\mu$=10% of the storing capacity.

Moreover, in order to emphasize the inventive steps and make the calculation simple, it is also assumed in the following examples that the amount of electricity $W_c$ of which the property owner consumes per day is negligibly small relative to the storing capacity $W_{off}$ of the energy storage device, i.e, $W=(1-\eta)\times W_{off}$.

It should be appreciated that while these techniques are exemplary of preferred embodiments for the practice of the invention, those of skill in the art, in light of the present disclosure, will recognize that numerous modifications can be made without departing from the spirit and intended scope of the invention.

EXAMPLE 1

For the property as discussed above, the profit made from storing and selling the off-peak electricity for the property owner per day can be calculated as follows:

$$P_{day} = (R \times W) - (R_{off} \times W_{off}) - (\mu \times W_{off})$$
$$= (R \times (1-\eta) - R_{off} - \mu) \times W_{off}$$
$$= (¥1/\text{kWh} - ¥0.10/\text{kWh} - ¥0.25/\text{kWh} - ¥0.10/\text{kWh}) \times$$
$$600 \text{ kWh/day}$$
$$= ¥330,$$

and the profit per each month is about $$P_{month}=(¥330/\text{day} \times 365 \text{ day})/12$$
$$=¥10,037.5.$$

The profit made from the off-peak electricity can be used to pay off debts, such as mortgages, credit card payments, of the property owner, if any.

EXAMPLE 2

As the technology of energy storages advances, it makes largely storing the off-peak electricity possible, and the cost for storing the off-peak electricity can also be significantly reduced. For example, a reliable energy storage system, such as a rechargeable zinc battery, at the cost as low as about ¥1,000/kWh is available on the market, which is rechargeable over 10,000 cycles, equivalent to a lifetime of about 30 years.

For the property having an area of 150 m$^2$, with an energy storage system having the capacity of storing 4 kWh of the off-peak electricity per square meter installed therein, as shown in Example 1, the one-time cost of the energy storage system is about $$¥1,000/\text{kWh} \times 4 \text{ kWh/m}^2 \times 150 \text{ m}^2=¥600,000.$$

As discussed in EXAMPLE 1, for such an energy storage system, the profit made from storing the off-peak electricity and selling the same to the power provider is about ¥10,037.5 per month. Thus, the cost (or investment) of the energy storage system can be paid off in about 5 years.

According to the invention, there are a variety of scenarios to pay off the cost of the energy storage system. For example, the property owner may take the cost of the energy storage system and the profit made therefrom.

As discussed above, for the 150 m$^2$ property, the cost for the energy storage system with the storing capacity of 4 kWh/m$^2$ is about ¥600,000. The investment of the energy storage system can be paid off in about 5 years, by storing the off-peak electricity and selling the same to the power provider.

If the property owner pays off the one-time cost of ¥600,000, the owner will enjoy the profit made during the next 25 years of the lifetime of the energy storage system, which is about ¥3,011,250.

The property owner may utilize financial instruments such as a mortgage to pay off the cost monthly. For a mortgage of ¥600,000 with a loan term of 30 years and an interest rate of 5%, the monthly payment is about ¥3,220.93 The owner can still make a monthly profit of about (¥10,037.5−¥3,220.93)= ¥6,816.57. Over the 30 years of the lifetime of the energy storage system, the owner can gain a profit of ¥2,453,965.2, by storing the off-peak electricity and selling the same to the power provider.

In addition, the cost of the energy storage system may be consolidated with the cost of the property. For example, the cost for the land is about ¥1,500/m$^2$, the building cost is about ¥3,500/m², the cost for the energy storage system with the storing capacity of 4 kWh/m² is about (¥1,000/kWh×4 kWh/m²)=¥4,000/m², which the total cost is about ¥9,000/m².

If the property is sold at a price of ¥12,000/m² without the energy storage system installed, the price for the property with the energy storage system installed will be about ¥16,000/m². For the property of 150 m², the total sale price is about ¥2,400,000.

Assuming that the property owner will pay a downpayment of 30% when purchasing it, the property owner needs a mortgage of ¥1,680,000. For a loan term of 30 years and an interest rate of 5%, the monthly payment for the mortgage is about ¥9,018.60. In this case, the property owner can still make a monthly profit of (¥10,037.5−¥9,018.60)=¥1018.9.

Other scenarios include, but are not limited to, that the property developer and the property owner share the cost of the energy storage system and the profit made therefrom; or the property developer, the property owner and the energy storage system provider share the cost of the energy storage system and the profit made therefrom. The percentages of the cost and profit sharing may upon the agreements among the property owner, the property developer and the energy storage system provider.

EXAMPLE 3

In this exemplary embodiment, the invention provides an energy storage network for storing off-peak electricity associated with a plurality of properties, $\{B_k\}$, k=1, 2, ... N, N being the number of the plurality of properties, as shown in FIG. 1 and making a profit therefrom. The plurality of properties $\{B_k\}$ may be corresponding to one or more subdivisions. The network may be a management system for storing off-peak electricity and making the profit therefrom, corresponding to a subdivision for example. The network includes a plurality of energy storage devices associated with a plurality of properties $\{B_k\}$, as shown in FIGS. 1 and 3. Each energy storage device is chargeable or dischargeable, upon demand, and is associated with a property $B_k$ of the subdivision. The network also includes a central control unit coupled to the plurality of energy storage devices and an electricity grid of at least one electricity provider, as shown in FIG. 3. The central control unit has a plurality of controllers, as shown in FIG. 4. Each controller is coupled to a respective energy storage device associated with the property $B_k$ and configured to control operation of the energy storage device such that the energy storage device associated with the property $B_k$ is charged at an off-peak time each day when a demand for electricity is low, with an amount of off-peak electricity, $(W_{off})_k$, from the electricity grid, and is discharged at a peak time each day when the demand for electricity is high, to provide an amount of electricity, $W_k$, to the at least one electricity provider. For the property $B_k$, the amount of the electricity provided to the at least one electricity provider each day is $$W_k = (1-\eta_k) \times (W_{off})_k - (W_c)_k,$$

where $\eta_k$ is a loss rate of the electricity stored in the energy storage device associated with the property $B_k$, and $(W_c)_k$ is an amount of consumed electricity of which the property $B_k$ consumes per day. The off-peak electricity is capitalized for the property $B_k$ each day at an amount of $$P_k = R_k \times W_k - (R_{off})_k \times (W_{off})_k - \mu_k \times (W_{off})_k,$$

where $R_k$ is a rate of selling the stored electricity in the energy storage device associated with the property $B_k$ to the at least one electricity provider at the peak time, $(R_{off})_k$ is a rate of buying the electricity from the at least one electricity provider at the off-peak time for the property $B_k$, and $\mu_k$ is a managing cost for maintaining the energy storage device associated with the property $B_k$. For the plurality of properties $\{B_k\}$, a total amount of the electricity provided to the at least one electricity provider each day is $$W_{total} = \sum_{k=1}^{N} W_k,$$

and the off-peak electricity is capitalized for the plurality of properties $\{B_k\}$ each day at an amount of $$P_{total} = \sum_{k=1}^{N} P_k.$$

The profit made from storing the off-peak electricity for each property is discussed in EXAMPLES 1-2 for different scenarios.

EXAMPLE 4

One aspect of the invention is to provide a method of managing the energy storage network associated with a plurality of properties, $\{B_k\}$, k=1, 2, ... N, N being the number of the plurality of properties $\{B_k\}$ as shown in FIGS. 1 and 3 and securitizing the profits made therefrom. The plurality of properties $\{B_k\}$ may be corresponding to one or subdivisions. For example, instead of a homeowner, the homeowner association may cooperatively manage the energy storage network in one or more subdivisions, and therefore the profits made therefrom. In one embodiment, the homeowner association may raise fund to facilitate installations and maintenance of the energy storage systems through private equity or venture capital instruments, or through initial public offering (IPO) instruments. Further, the homeowner association may invest partial or complete profits into real estates, stocks, mutual funds, and so on.

In one embodiment, the method of managing the energy storage network and profits made from the energy storage network includes providing the energy storage network.

The energy storage network as shown in FIGS. 1, 3 and 4 comprises a plurality of energy storage devices. Each energy storage device is chargeable or dischargeable, upon demand, and is associated with a respective property $B_k$. Each energy storage device may include one or more rechargeable batteries, one or more super-capacitors, or a combination of them. The energy storage network also includes a control unit coupled to the plurality of energy storage devices and an electricity grid of at least one electricity provider, as shown in FIG. 3. The control unit may include a plurality of controllers, as shown in FIG. 4, each controller coupled to a respective energy storage device associated with the respective property $B_k$.

The method also includes controlling, by the plurality of controllers, operations of the plurality of energy storage device such that the respective energy storage device associated with the respective property $B_k$ is charged at an off-peak time each day when a demand for electricity is low, with an amount of off-peak electricity, $(W_{off})_k$, from the electricity grid, and is discharged at a peak time each day when the demand for electricity is high, to provide an amount of electricity $W_k$, to the at least one electricity provider.

Furthermore, the method also includes investing partial or complete portion of the profits made from the energy storage network into real estates, stocks, mutual funds, and a combination thereof. The profits made from the energy storage network each day is at an amount of $$P_{total} = \sum_{k=1}^{N} P_k,$$

where $P_k$ is a profit made from an energy storage device associated with the property $B_k$ each day:

$$P_k = R_k \times W_k - (R_{off})_k \times (W_{off})_k - \mu_k \times (W_{off})_k,$$

where $W_k = (1-\eta_k) \times (W_{off})_k - (W_c)_k$, $\eta_k$ is a loss rate of the electricity stored in the energy storage device associated with the property $B_k$, $(W_c)_k$ is an amount of consumed electricity of which the property $B_k$ consumes per day, $R_k$ is a rate of selling the stored electricity in the energy storage device associated with the property $B_k$ to the at least one electricity provider at the peak time, $(R_{off})_k$ is a rate of buying the electricity from the at least one electricity provider at the off-peak time for the property $B_k$, and $\mu$ is a managing cost for maintaining the energy storage device associated with the property $B_k$.

In addition, the method may further include raising fund to facilitate installations and maintenance of the energy storage network through private equity or venture capital instruments, or through initial public offering (IPO) instruments.

Moreover, the method may include monitoring the amount of off-peak electricity $(W_{off})_k$, the amount of consumed electricity $(W_c)_k$, and the amount of sold electricity $W_k$ for the property $B_k$ per day.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope as is discussed and set forth above and below including claims and drawings. Furthermore, the embodiments described above and claims set forth below are only intended to illustrate the principles of the present invention and are not intended to limit the scope of the invention to the disclosed elements. Accordingly, the scope of the present invention is defined by the appended claims rather than the foregoing description and the exemplary embodiments described therein.

What is claimed is:

1. An energy storage network associated with a plurality of properties, $\{B_k\}$, for storing and capitalizing off-peak electricity, $k=1, 2, \ldots N$, N being the number of the plurality of properties, comprising:

a plurality of energy storage devices coupled to an electricity grid of at least one electricity provider, wherein each energy storage device is chargeable or dischargeable, upon demand, and is associated with a respective property $B_k$; and a control unit coupled to the plurality of energy storage devices and the electricity grid, and configured to control operations of each energy storage device such that each energy storage device associated with the respective property $B_k$ is charged at an off-peak time each day when a demand for electricity is low, with an amount of off-peak electricity, $(W_{off})_k$, from the electricity grid, and is discharged at a peak time each day when the demand for electricity is high, to provide an amount of electricity, $W_k$, to the at least one electricity provider, wherein for the respective property $B_k$, the amount of the electricity provided to the at least one electricity provider each day is $$W_k = (1-\eta_k) \times (W_{off})_k - (W_c)_k,$$

wherein $\eta_k$ is a loss rate of the electricity stored in the energy storage device associated with the respective property $B_k$, and $(W_c)_k$ is an amount of consumed electricity of which the respective property $B_k$ consumes per day;

wherein the off-peak electricity is capitalized for the respective property $B_k$ each day at an amount of $$P_k = R_k \times W_k - (R_{off})_k \times (W_{off})_k - \mu_k \times (W_{off})_k,$$

wherein $R_k$ is a rate of selling the stored electricity in the energy storage device associated with the respective property $B_k$ to the at least one electricity provider at the peak time, $(R_{off})_k$ is a rate of buying the electricity from the at least one electricity provider at the off-peak time for the respective property $B_k$, and $\mu_k$ is a managing cost for maintaining the energy storage device associated with the respective property $B_k$; and wherein for the plurality of properties $\{B_k\}$, a total amount of the electricity provided to the at least one electricity provider each day is $$W_{total} = \sum_{k=1}^{N} W_k,$$

and wherein the off-peak electricity is capitalized for the plurality of properties $\{B_k\}$ each day at an amount of $$P_{total} = \sum_{k=1}^{N} P_k.$$

2. The energy storage network of claim 1, further comprising a plurality of electricity meters or sensors, each electricity meter or sensor electrically coupled to a respective energy storage device associated with the respective property $B_k$ for monitoring the amount of off-peak electricity $(W_{off})_k$, and the amount of electricity, $W_k$ for the respective energy storage device associated with the respective property $B_k$.

3. The energy storage network of claim 1, wherein each energy storage device comprises one or more re-changeable batteries, one or more super-capacitors, or a combination of them.

4. The energy storage network of claim 1, wherein the control unit comprises a plurality of controllers, each controller being operably coupled to a respective energy storage device for controlling operations of the respective energy storage device.

5. The energy storage network of claim 4, wherein the control unit further comprises a master controller operably coupled to the plurality of controllers for controlling operations of each of the plurality of controllers.

6. The energy storage network of claim 5, wherein the master controller comprises one or more computers, one or more mobile computing devices, or a combination of them.

7. A method of storing and capitalizing off-peak electricity, comprising:
providing an energy storage network, associated with a plurality of properties, $\{B_k\}$, k=1, 2, ... N, N being the number of the plurality of properties, the energy storage network comprising:
a plurality of energy storage devices coupled to an electricity grid of at least one electricity provider, wherein each energy storage device is chargeable or dischargeable, upon demand, and is associated with a respective property $B_k$; and
a control unit coupled to the plurality of energy storage devices and the electricity grid; and
controlling, by the control unit, operations of each energy storage device such that each energy storage device associated with the respective property $B_k$ is charged at an off-peak time each day when a demand for electricity is low, with an amount of off-peak electricity, $(W_{off})_k$, from the electricity grid, and is discharged at a peak time each day when the demand for electricity is high, to provide an amount of electricity $W_k$, to the at least one electricity provider,
wherein for the respective property $B_k$, the amount of the electricity provided to the at least one electricity provider each day is $$W_k = (1-\eta_k) \times (W_{off})_k - (W_c)_k,$$

wherein $\eta_k$ is a loss rate of the electricity stored in the energy storage device associated with the respective property $B_k$, and $(W_c)_k$ is an amount of consumed electricity of which the respective property $B_k$ consumes per day;
wherein the off-peak electricity is capitalized for the respective property $B_k$ each day at an amount of $$P_k = R_k \times W_k - (R_{off})_k \times (W_{off})_k - \mu_k \times (W_{off})_k,$$

wherein $R_k$ is a rate of selling the stored electricity in the energy storage device associated with the respective property $B_k$ to the at least one electricity provider at the peak time, $(R_{off})_k$ is a rate of buying the electricity from the at least one electricity provider at the off-peak time for the respective property $B_k$, and $\mu_k$ is a managing cost for maintaining the energy storage device associated with the respective property $B_k$; and
wherein for the plurality of properties $\{B_k\}$, a total amount of the electricity provided to the at least one electricity provider each day is $$W_{total} = \sum_{k=1}^{N} W_k,$$

and wherein the off-peak electricity is capitalized for the plurality of properties $\{B_k\}$ each day at an amount of $$P_{total} = \sum_{k=1}^{N} P_k.$$

8. The method of claim 7, further comprising:
monitoring the amount of off-peak electricity $(W_{off})_k$, the amount of consumed electricity $(W_c)_k$, and the amount of sold electricity $W_k$ for the respective property $B_k$ per day.

9. The method of claim 8, wherein the monitoring step is performed by a plurality of electricity meters or sensors, each electricity meter or sensor electrically coupled to a respective energy storage device associated with the respective property $B_k$.

10. The method of claim 7, wherein each energy storage device comprises one or more re-changeable batteries, one or more super-capacitors, or a combination of them.

11. The method of claim 7, wherein the control unit comprises a plurality of controllers, each controller being operably coupled to a respective energy storage device for controlling operations of the respective energy storage device.

12. The method of claim 11, wherein the control unit further comprises a master controller operably coupled to the plurality of controllers for controlling operations of each of the plurality of controllers.

13. The method of claim 12, wherein the master controller comprises one or more computers, one or more mobile computing devices, or a combination of them.

14. A non-transitory computer-readable medium storing instructions which, when executed by one or more processors, cause an energy storage network to perform operations of storing and capitalizing off-peak electricity, wherein the energy storage network has a plurality of energy storage devices coupled to an electricity grid of at least one electricity and associated with a plurality of properties, $\{B_k\}$, k=1, 2, ... N, N being the number of the plurality of properties, wherein each energy storage device is chargeable or dischargeable, upon demand, and is associated with a respective property $B_k$, the operations comprising:
charging each energy storage device at an off-peak time each day when a demand for electricity is low, with an amount of off-peak electricity, $(W_{off})_k$, from the electricity grid; and
discharging each energy storage device at a peak time each day when the demand for electricity is high, to provide an amount of electricity $W_k$, to the at least one electricity provider,
wherein for the respective property $B_k$, the amount of the electricity provided to the at least one electricity provider each day is $$W_k = (1-\eta_k) \times (W_{off})_k - (W_c)_k,$$

wherein $\eta_k$ is a loss rate of the electricity stored in the energy storage device associated with the respective property $B_k$, and $(W_c)_k$ is an amount of consumed electricity of which the respective property $B_k$ consumes per day;
wherein the off-peak electricity is capitalized for the respective property $B_k$ each day at an amount of $$P_k = R_k \times W_k - (R_{off})_k \times (W_{off})_k - \mu_k \times (W_{off})_k,$$

wherein $R_k$ is a rate of selling the stored electricity in the energy storage device associated with the respective property $B_k$ to the at least one electricity provider at the peak time, $(R_{off})_k$ is a rate of buying the electricity from the at least one electricity provider at the off-peak time for the respective property $B_k$, and $\mu_k$ is a managing cost for maintaining the energy storage device associated with the respective property $B_k$; and wherein for the plurality of properties $\{B_k\}$, a total amount of the electricity provided to the at least one electricity provider each day is $$W_{total} = \sum_{k=1}^{N} W_k,$$

and wherein the off-peak electricity is capitalized for the plurality of properties $\{B_k\}$ each day at an amount of $$P_{total} = \sum_{k=1}^{N} P_k.$$

15. The non-transitory computer-readable medium of claim 14, wherein the operations further comprises:
monitoring the amount of off-peak electricity $(W_{off})_k$, the amount of consumed electricity $(W_c)_k$, and the amount of sold electricity $W_k$ for the respective property $B_k$ per day.

16. The non-transitory computer-readable medium of claim 14, wherein each energy storage device comprises one or more re-changeable batteries, one or more super-capacitors, or a combination of them.

* * * * *